Oct. 4, 1932.   W. F. WILMOTH   1,880,626
PUG MILL FOR PREPARING ASPHALT PAVING MIXTURES
Filed March 24, 1930    3 Sheets-Sheet 1

Inventor:-
William F. Wilmoth
by his Attorneys
Howson & Howson

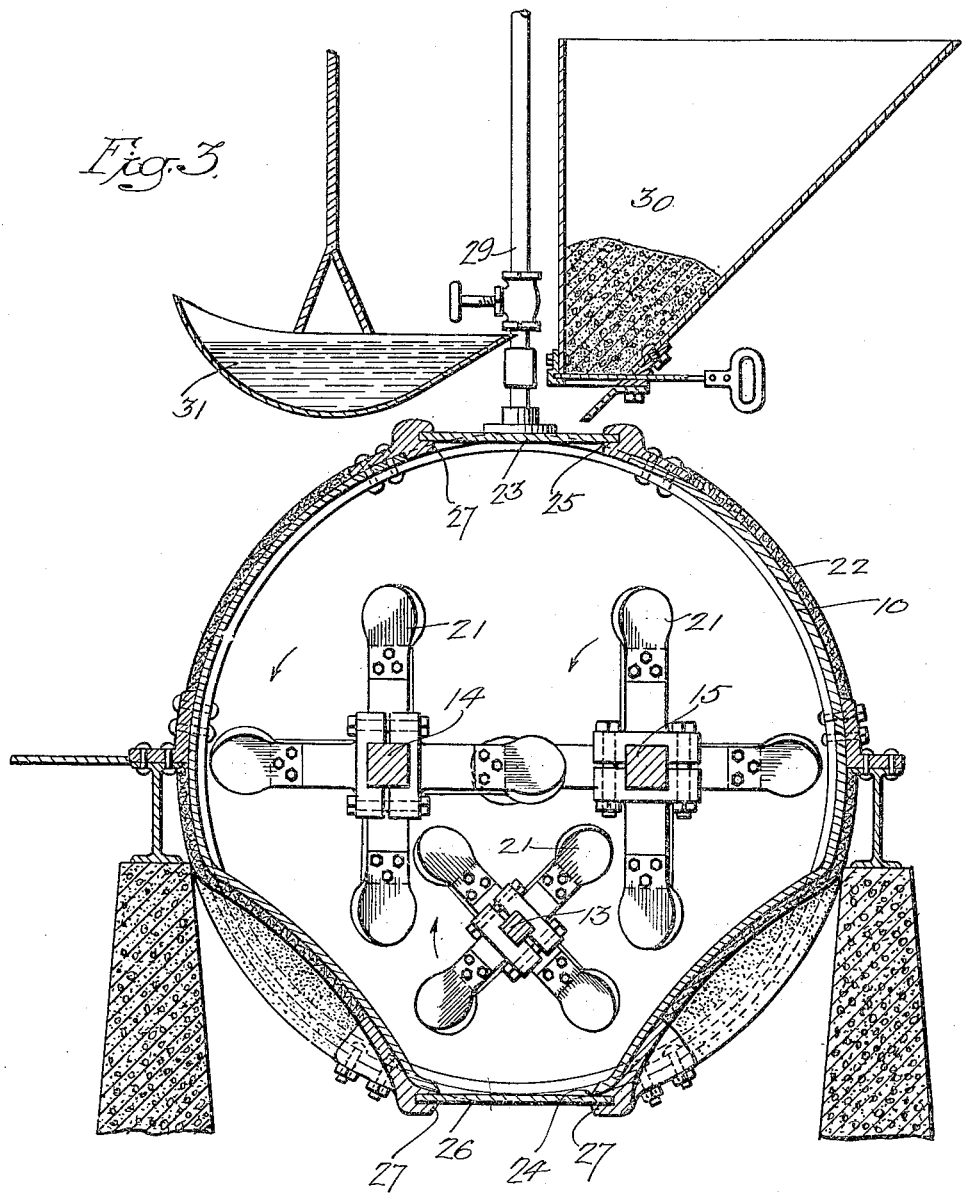

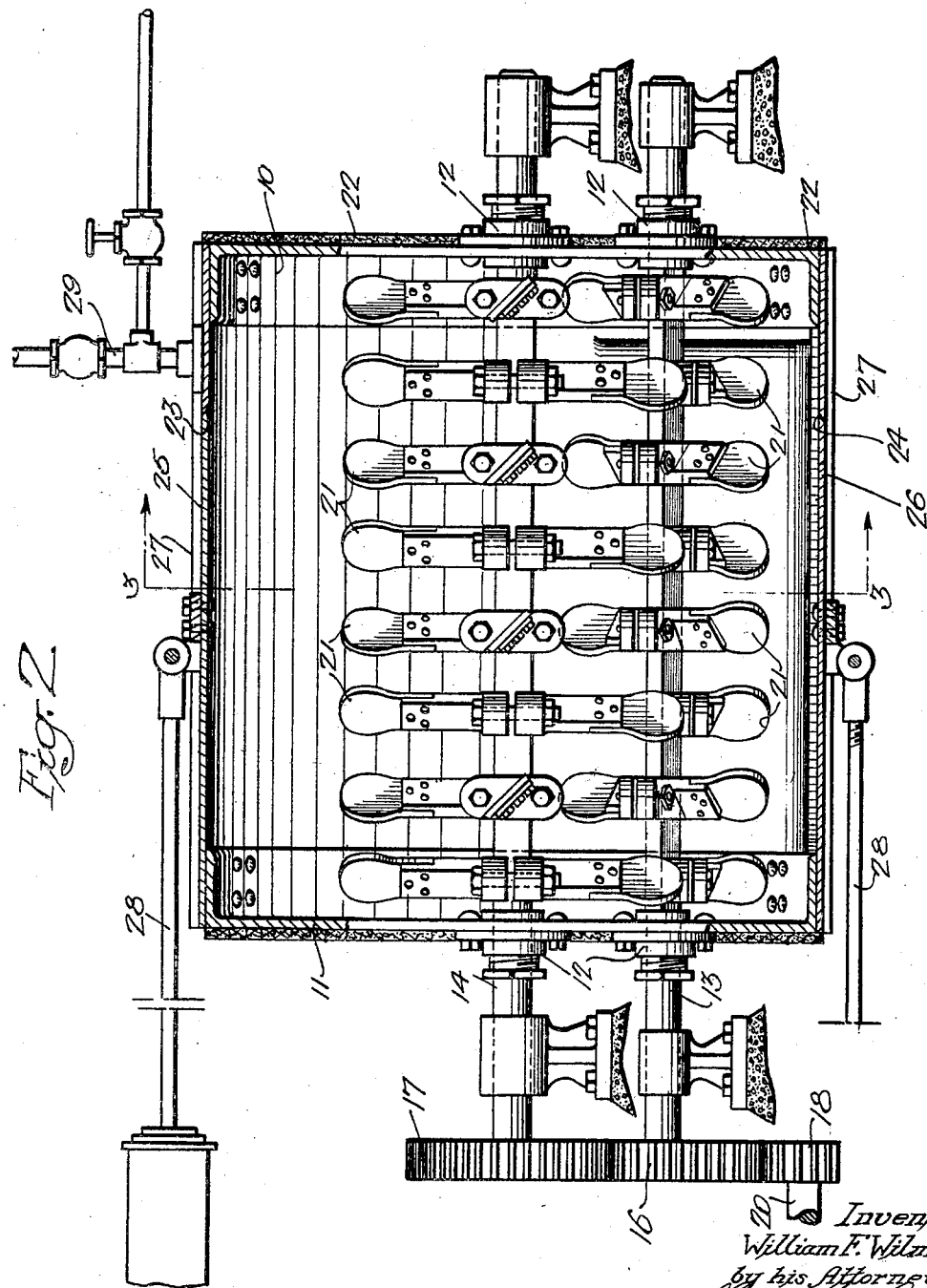

UNITED STATES PATENT OFFICE

WILLIAM F. WILMOTH, OF PHILADELPHIA, PENNSYLVANIA

PUG MILL FOR PREPARING ASPHALT PAVING MIXTURES

Application filed March 24, 1930. Serial No. 438,608.

This invention relates to apparatus for mixing asphalt paving materials and more particularly to apparatus especially adapted for use in the production of sheet asphalt and asphaltic concrete mixtures.

Sheet asphalt and asphaltic concrete mixtures are difficult to prepare and with the present apparatus are faultily prepared due to the fact that the aggregate employed as the base of the mixture ordinarily includes sand having incorporated therein small amounts of clay. This clay, in the ordinary type of pug mill, or in a pug mill of the type now in fairly common use, forms in small balls which are coated with, and incorporate, sand, and when the asphalt is added to the mixture accept a coating of the asphalt or asphaltic compound, while maintaining their integrity. Where a mixture incorporating such balls is laid, weak spots are produced in the roadway, the balls breaking readily under pressure and admitting water by which the clay and sand are washed from the roadway, causing pitting. Furthermore, the ordinary pug mill as employed in the production of such mixtures has a tendency to produce uneven mixtures; that is to say, a mixture wherein the asphalt compound and the sand filler are separated from the heavier portions of the aggregate, resulting in a finished pavement having "fat" and "lean" spots which soon result in an uneven surface.

In an endeavor to overcome the defects of the ordinary pug mill, the tumbling mill has been employed, but has been found entirely unsatisfactory in that it will not break the clay balls, and in that it cannot be economically operated, a considerable time being required in manipulation of the drum in the adjustment of the feed and discharge door to its feed and discharge positions. Furthermore, paving materials mixed in the tumbling mill must be mixed in a much longer interval than is ordinarily necessary in the pug mill and than is practical in commercial production of such materials, and the materials themselves have a tendency to form in balls in the mill, the balls rolling about in the mill without any proper mixture of the contents thereof. Accordingly, important objects of the present invention are the provision of a pug mill structure of such character that thorough reduction and mixture of the aggregate charge may be provided; that thorough impregnation of the aggregate charge by the asphalt composition may result and in which the time required for completing the mixture is reduced to a practical minimum.

A further object of the invention is the production of apparatus of this character which may be economically and practically manufactured, which will be durable and efficient in service and a general improvement in the art.

These and other objects I attain by the construction shown in the accompanying drawings wherein, for the purpose of illustration, I have shown a preferred embodiment of my invention and wherein:

Fig. 2 is a longitudinal sectional view therethrough; and

Fig. 3 is a section on line 3—3 of Fig. 2.

Figure 1:
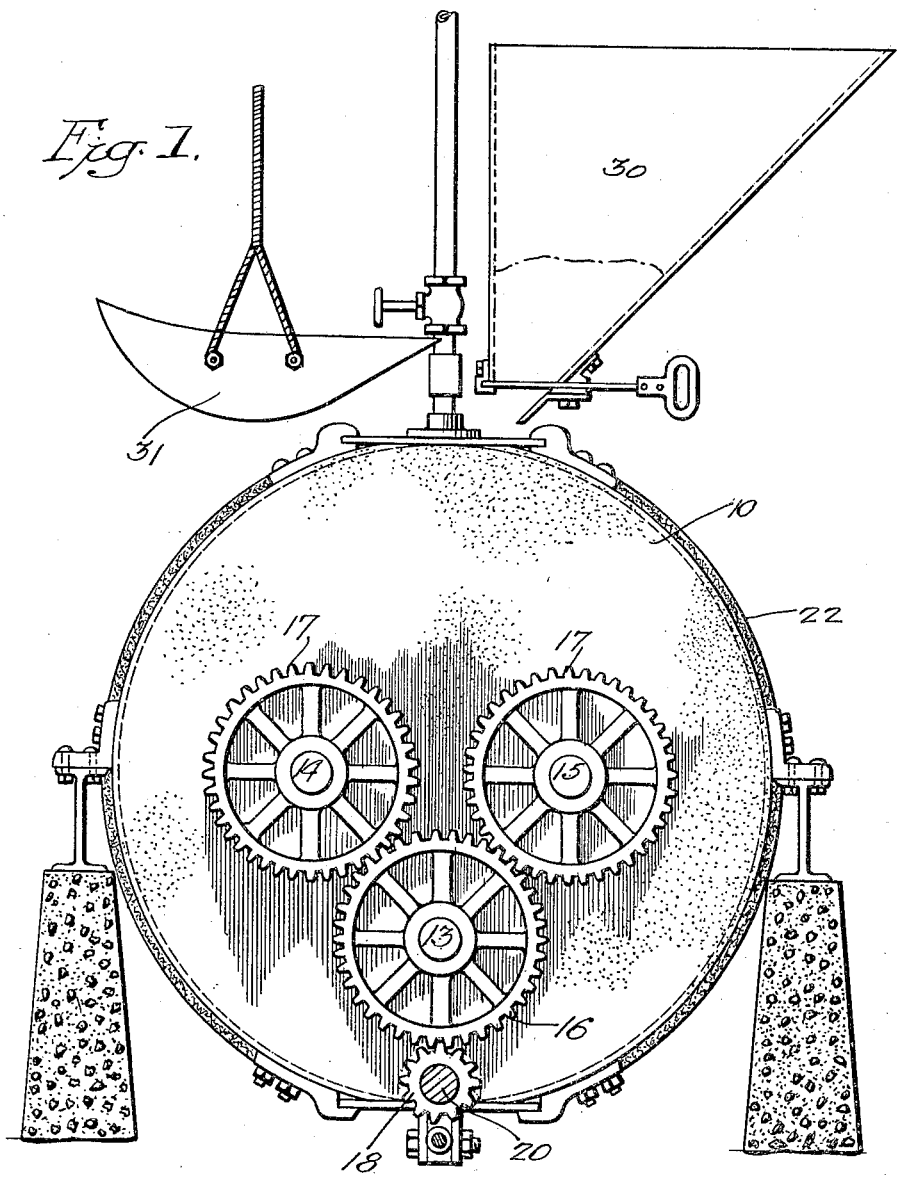
Fig. 1 is an end elevation of a pug mill construction in accordance with my invention.

Referring now more particularly to the drawings, a mixing apparatus constructed in accordance with my invention comprises a substantially cylindrical casing 10 having its ends closed by heads 11 preferably of cast material. These heads are each provided with bearings 12 for the passage of three agitator shafts 13, 14 and 15, of which the shaft 13 is equipped with a gear 16 meshing with gears 17 carried by the shafts 14 and 15 and with a pinion 18 on a drive shaft 20. Any other means for producing the desired drive may be employed, the present structure being employed by way of illustration alone.

Within the casing each shaft 13, 14 and 15 is equipped with agitator blades 21. The shafts 14 and 15, hereinafter referred to as the upper shafts, have impellers arranged thereon to deliver materials in opposite directions as the shafts are rotated so that there is a circulation in the upper portion of the aggregate mass by these impellers longitudinally of the casing in opposite directions. The lower shaft has its impellers 21 divided into two groups, each group acting to deliver material toward the center of the bottom of the mixer. The casing wall is interiorly arranged to closely approach the edges of the blades so that adherence of material to these walls is prevented to the greatest possible extent. To this same end, the exterior of the mixer has applied thereto a heat insulation coating 22. The upper and lower walls of the mixer casing are provided with longitudinally-extending openings 23 and 24 closed by sliding doors 25 and 26 operating in guides 27 defining the edges of the openings 23 and 24. Each door has associated therewith a fluid pressure operated ram 28 whereby it may be opened and closed. The casing has let therethrough an air intake pipe 29 leading from a suitable source of air under pressure and the mixer will preferably have arranged thereabove apparatus for weighing and discharging the aggregate as indicated generally at 30 and apparatus for weighing and discharging asphalt or asphaltic compounds as indicated at 31, these apparatuses each discharging through the opening provided when the upper door 25 is withdrawn through its ram.

In operation of the apparatus just described the aggregate is first delivered to the mixing chamber from the apparatus 30 and the machine set in operation. After approximately one minute of operating time the aggregate will be thoroughly mixed, all sand or clay balls therein being thoroughly broken up due to the fact that the agitator arms produce a thorough churning of the material. This is due in part to the fact that the agitator arms operate through overlapping paths and due to the fact that material shifted longitudinally of the mixer by the impellers of shafts 14 and 15 will be at least partially retarded by the adverse action set up through the reverse arrangement of one of the sets of impellers employed on the shaft 13. Furthermore, since the impellers of shaft 13 serve to constantly move material toward the center of the mixer, there will be a constant downward trend of material at the ends of the mixer and a constant upward trend at the center thereof. Material moving upwardly at the center of the mixer is simultaneously acted upon by two sets of arms tending to move it in opposite directions so that a very thorough agitation will result and the possibility of any sand or clay balls remaining is eliminated or reduced to a minimum. The asphaltic mixture is then introduced through door 25 after which this door is closed and the apparatus put under pressure by admission of air through pipe 29. When mixing of the aggregate and the asphaltic medium has been completed, which would ordinarily occupy about one minute of running time, the lower door 26 is opened and the charge discharged therethrough. In this connection it is pointed out that discharge of the contents is facilitated due to the fact that the lower centrally arranged shaft has its impeller so arranged that the charge is forced to the center and thus brought into alignment with the opening.

During the mixing operation adhesion of the charge to the walls is prevented both by the engagement with the impellers of any particles which may attempt to adhere to the wall and by the fact that the heat of the charge is retained through use of the insulating covering 22. Due to the use of the enclosing casing with its sealing doors dissemination of dust during preliminary mixing of the charge before addition of the asphalt is prevented. The closure effected by the upper door not only serves to retain the fluid pressure within the casing but likewise prevents dissemination of dust and loss of heat from the mixture. It, furthermore, prevents "slopping over" which occurs in all ordinary pug mills and places a practical limit on the speed at which such ordinary pug mills can be operated. With use of the complete closure, the pug mill can be operated at any desired speed.

It will be obvious that a construction of this character may be very readily and cheaply produced and will insure an efficient mixing of asphalt or asphaltic compositions with aggregates in a thorough impregnation of the aggregates due to the use of pressure with agitation, thus insuring thorough passage of the pressure through the entire charge.

It will also be obvious that the construction is capable of a certain range of change and modification without in any manner departing from the spirit of my invention, I accordingly do not wish to be understood as limiting myself thereto except as hereinafter claimed.

I claim:
1. In a pug mill, a casing three horizontally disposed parallel shafts extending between and having bearing in the ends of the casing, two of said shafts being horizontally aligned, the third shaft being arranged below and between the first-named shafts, impeller means on said shafts, the impeller means of one of the first-named shafts causing the material to move oppositely to the impeller means of the other of the first-named shafts, the impeller means of the last shaft causing material to move from the ends of the casing toward the center thereof.

2. In a pug mill, a casing, three horizontally disposed parallel shafts extending between and having bearing in the ends of the casing, two of said shafts being horizontally aligned, the third shaft being arranged below and between the first-named shafts, impeller means on said shafts, the impeller means of one of the first-named shafts causing the material to move oppositely to the impeller means of the other of the first-named shafts, the impeller means of the last shaft causing material to move from the ends of the casing toward the center thereof, and a discharge door in the casing in the center of the bottom thereof.

3. In a pug mill, a casing having an opening in its bottom intermediate the ends thereof, a door for closing said opening, impeller means within the casing for shifting material therein, at a point spaced above the bottom in opposite directions and impeller means at the bottom of the casing beneath and between the first-named impeller means for moving material from the ends of the casing towards said opening.

4. In a pug mill, a casing having an opening in its bottom intermediate the ends thereof, a door for closing said opening, impeller means within the casing for shifting material therein, at a point spaced above the bottom, in opposite directions, impeller means at the bottom of the casing beneath and between the first-named impeller means for moving material from the ends of the casing towards said opening, and means for placing the contents of the casing under pressure.

WILLIAM F. WILMOTH.